3,195,230
NICKEL BEARING CRYOGENIC WELDING MATERIAL AND PROCESS
James V. Peck, Plainfield, and Charles E. Witherell, Bound Brook, N.J., assignors to The International Nickel Company, Inc., New York, N.Y., a corporation of Delaware
No Drawing. Filed Oct. 1, 1962, Ser. No. 227,560
11 Claims. (Cl. 29—496)

The present invention relates to welding material for producing welds and weldments having good low temperature service properties and characteristics and, more particularly, to steel welding materials for producing cryogenic steel welds.

It is well known that flux-coated stick electrodes of the ASTM/AWS Classifications E8015-C2, E8016-C2 and E8018-C2 have been used to weld low-carbon nickel steel for low-temperature service. While these electrodes have provided fairly adequate weld strength of acceptable soundness for some purposes, the low temperature notch toughness of the weld metal has been unacceptable in many applications. It appears that variations in welding current and/or voltage have influenced the notch toughness of welds deposited with these electrodes such that welds made in the vertical or overhead positions often are inferior in toughness to welds made in the flat position at higher current settings. The reason or reasons for this difference in toughness characteristics with changes in welding heat caused by changes in current are not completely understood. However, it is believed to be related to the degree of homogeneity of the composition of the weld metal, particularly since the gross chemical analysis of the weld is not significantly affected by the welding current level within the electrode's useful range. In addition, the compositional factors that influence weld toughness often are only distinguishable on a microscopic scale, if at all. Thus, in many cases, these factors cannot be detected at all by visual appearance, even under very high magnifications, e.g., 500 diameters (500×), but only through physical measurements such as hardness, toughness and strength.

All electrodes of the aforementioned classes comprise a core wire of relatively unalloyed low-carbon steel and a suitable flux coating containing metallic nickel, e.g., in the form of a powder, which along with the fluxing and slagging ingredients, provides for the addition of nickel to the weld to prevent brittleness of the weld at low temperatures. To be effective in this respect, it appears that the nickel added through the flux coating should mix thoroughly and alloy with the steel from the core wire under the action of the welding arc. This alloying is dependent upon the heat of the arc and the turbulence of the weld puddle. Consequently, it would seem that variations in the thermal intensity of the arc will influence the compositional uniformity of the weld deposit resulting from alloying the coating constituents of the electrode with the core wire.

The submerged-arc welding process which affords a considerably higher rate of weld metal deposition than coated electrodes has also been useful to some extent in providing welds and weldments for cryogenic applications. The filler wires used in the submerged-arc process have been of relatively unalloyed low-carbon steel which is quite similar to those used for the aforedescribed coated electrode core wires. In this case, as in the case of the coated electrode, the necessary nickel addition has also been made through the flux. As with coated electrodes, variations in notch toughness of the weld metal have also been experienced in this process with variations in welding current and, because of the wider usable range of welding current and travel speed in submerged-arc welding, the toughness variations have been correspondingly wider than in coated electrode welding. Weld cracking has also been a problem with the submerged-arc process in attempting to deposit welds of adequate low temperature toughness. Consequently, this welding process has not been widely used for this purpose.

Attempts to produce a filler wire for either the submerged-arc process or the inert-gas process (including tungsten-arc and metal-arc) or a coated electrode core wire containing sufficient nickel to produce welds having adequate notch toughness at low temperatures have not met with success. The main difficulty in the use of such welding materials is that the welds produced therewith have exhibited a tendency to crack.

Thus, while it has been possible to fabricate nickel-steel vessels for service down to about 150° F. below zero (minus 150° F.) using commercially available materials, the procedure has not been thoroughly satisfactory nor has it provided fabricated vessels, etc., having the low temperature properties and/or characteristics currently being demanded by industry for various application. Coated electrodes have heretofore afforded the best results. However, the marginal notch toughness, the sensitivity to variations in toughness with variations in welding current and the low rate of welding deposition inherent in the coated electrode welding process have been serious drawbacks. While an automatic welding process such as the submerged-arc process could increase the rate of deposit of weld metal, this process also suffers from the disadvantage of producing welds having a wide variation in notch toughness. In addition, the welds produced using an automatic welding process are crack sensitive. Thus, these deleterious properties and/or characteristics have materially hindered its use.

Although many attempts were made to overcome the foregoing difficulties and other disadvantages, none, as far as we are aware, was entirely successful when carried into practice on an industrial scale.

It has now been discovered that crack-free welds having good notch toughness at low temperatures can be produced by employing a special welding material containing special ingredients in controlled amounts under particular conditions.

It is an object of the present invention to provide a steel weld having good cryogenic properties and/or characteristics.

Another object of the invention is to provide a substantially crack-free welding structure having good notch toughness at low temperatures.

The invention contemplates providing a process for producing a substantially crack-free weld and/or welded structure having good low temperature caracteristics and/or properties.

A further object of the invention is to provide a filler metal for use in insert-gas metal-arc welding which filler metal is particularly adapted for producing low-temperature service welds which are substantially crack-free.

The invention further contemplates providing a unique inert-gas metal-arc welding process for producing crack-free, cryogenic welds.

It is another object of the invention to provide a welding material particularly adapted for producing crack-free welds having good notch toughness in combination with good strength at low temperature in the submerged-arc welding process.

Still another object of the invention is to provide a special submerged-arc welding process for producing substantially crack-free welds having good low temperature properties and/or characteristics.

It is also an object of the invention to provide a coated electrode having a special core wire which electrode is particularly adapted for producing substantially crack-free, non-porous welds having good low temperature properties and/or characteristics.

It is likewise within the contemplation of the invention to provide an improved nickel-containing steel electrode which electrode has a flux coating containing special proportions of ingredients.

Among the further objects of the present invention is the provision of a coated electrode having a flux coating in unique combination with a novel core wire.

It is also a purpose of this invention to provide a novel coated electrode welding process for producing substantially crack-free welds having good notch toughness at low temperatures.

Other objects and advantages will become apparent from the following description.

Broadly stated, the present invention contemplates a welding material for use in shielded-arc welding, including arc welding with flux-coated electrodes, submerged-arc welding, inert-gas metal-arc welding, inert-gas tungsten-arc welding, etc. In general, the welding material, i.e., welding metal, is a low alloy steel which contains, by weight and in addition to any fluxing and slagging ingredients, about 2.5% to about 5% nickel, about 0.4% to about 1.5% manganese and about 0.1% to about 0.7% aluminum. In addition to iron, nickel, manganese and aluminum, the welding metal of this invention may also contain, by weight, up to about 0.5% molybdenum, less than about 0.07% carbon, up to about 0.7% silicon and up to about 0.1% calcium. The calcium content is based upon the amount added to the melt in producing the welding metal. The balance of the welding metal is substantially iron aside from the usual impurities and deoxidants. Advantageously, the welding material is substantially devoid of such deleterious elements as phosphorus and sulfur although it can tolerate up to about 0.02% phosphorus and up to about 0.02% sulfur provided that the sum of any phosphorus present and of any sulfur present is less than about 0.025%.

Nickel, in combination with the other ingredients of the welding material, is essential to maintaining low temperature toughness in the weld deposit and should not drop below about 2.5% if operability at temperatures below about minus 100° F. are desired for the weld. On the other hand, as nickel increases beyond about 5%, weld cracking will increase unless the amount of other elements, particularly sulfur and phosphorus, are substantially eliminated, e.g., less than about 0.002% of each. Consequently, in order to produce welds for service down to about minus 150° F., the nickel content is between about 2.5% and about 5% and, advantageously, between about 3% and about 4%.

Manganese in the welding material of this invention is essential to produce crack-free welds. It aids in the production of substantially non-porous weld deposits. Contrary to its beneficial effect of lowering the impact transition temperatures in wrought alloy steels in amounts up to about 1.5%, considerably smaller additions of manganese decrease notch toughness (that is, manganese raises the transition temperature) of weld metal. Nevertheless, hot cracking is not substantially eliminated particularly in highly restrained welds in heavy plate without the presence of at least about 0.4% manganese. Consequently, in order to insure sound weld deposits without materially adversely affecting low-temperature notch toughness of the weld deposits produced, the manganese is present in amounts from about 0.4% to about 1.5%. Advantageously, manganese is present in amounts from about 0.8% to about 1.3% since the deposits produced with such welding materials have better low temperature characteristics while also being substantially free of cracks. Welds containing very small amounts of manganese, e.g., less than about 0.3%, also were prone to porosity which appeared to result from atmospheric oxygen pickup and an insufficient level of deoxidizers in the weld fusion.

Aluminum, in combination with the heretofore mentioned other ingredients of the welding material, is present in amounts of about 0.1% to about 0.7%. Aluminum is an efficient deoxidizer in the welding materials of this invention and thus contributes importantly to the production of sound welds. For example, the presence of 0.1% aluminum is beneficial in obtaining substantial freedom from hot-cracking. On the other hand, if aluminum is greater than about 0.7%, the welds will lack the degree of low temperature notch toughness required for service down to about minus 150° F. In addition, aluminum acts to obviate the detrimental effects of manganese on notch toughness.

While somewhat over 0.1% carbon is normal and beneficial for wrought steels of the ASTM A–203 type, this level is excessive for the weld metal of this invention since at these high levels, the deposited metal is sensitive to weld cracking. The higher carbon contents also lower the tolerable levels of residual phosphorus and sulfur and thereby increase brittleness. Provided the residual amounts of sulfur and phosphorus are low, the weld wire may contain as much as about 0.07% carbon without detrimental effects. Advantageously, the carbon content of the welding material is below about 0.05%. At these low carbon levels, the weld metal is sound and substantially free from cracks and it still is characterized by satisfactory strength.

While residual silicon is usually present in the welding material as a deoxidation residual, it is not an essential constituent of the welding material of this invention since necessary deoxidation during welding may be accomplished by the manganese and/or aluminum present therein. Thus, silicon may be present in amounts of up to about 0.7%. However, if the silicon content of the welding material is excessive, i.e., above about 0.7%, weld toughness will decrease and the weld metal will be crack-sensitive. Advantageously, the welding material should contain a small amount of silicon, i.e., about 0.1% to about 0.2%, to aid in the deoxidation of the weld. For example, even though the alloy to be used as the welding material is thoroughly killed, there is a tendency for oxygen to be picked up in the weld metal from the atmosphere and the flux under the intense heat of the welding arc. In order to vitiate the deleterious effects of oxygen on the low temperature notch toughness of the weld deposit, silicon can be advantageously employed to fix the oxygen.

Molybdenum is also an optional element and may be present in amounts up to about 0.5% as shown hereinbefore. However, its presence, particularly in submerged-arc welding, offers an advantage in assuring crack-free welds, especially under conditions of severe restraint, without detrimentally affecting notch toughness. If molybdenum is present in amounts above about 0.5%, there is a tendency for the notch toughness to be impaired. Thus, molybdenum, when present, should not exceed about 0.5%.

When producing the welding metal, calcium may optionally be added to the melt as a deoxidizer. When it is so added, calcium offers insurance against a high oxide-inclusion content in the welding metal which may carry over to the weld and form stress risers therein which may, under certain circumstances, initiate micro-fissures and impair weld quality. It is not essential to recover calcium in the melt to derive its intended benefits.

With respect to phosphorus and sulfur, which are residual impurities, these elements if allowed to increase beyond the limits heretofore shown, increase the sensitivity of the weld metal to hot cracking as well as lowering the notch toughness. Consequently, these elements should be held to 0.025% in total.

In carrying the invention into practice, when the welding metal is to be employed in the submerged-arc welding process, advantageous results will be obtained when it contains up to about 0.05% carbon, from about 0.1% to about 0.2% silicon, from about 3.25% to about 3.75% nickel, from about 0.8% to about 1.3% manganese, from about 0.25% to about 0.35% molybdenum, from about 0.1% to about 0.2% aluminum, from about 0.03% to about 0.07% calcium (added to the melt), less than about 0.01% phosphorus, less than about 0.01% sulfur, the sum of any phosphorus and any sulfur present being less than about 0.015% with the balance substantially iron. Such welding metals are characterized by producing welds having a notch toughness of at least 15 foot-pounds at minus 150° F. and being substantially crack-free and porosity-free. Molybdenum, as is shown hereinbefore, is advantageously included in the submerged-arc filler wires of this invention since in the range of 0.25% to 0.35% it affords increased resistance to weld cracking without detrimentally affecting notch toughness at low temperatures. The aluminum in these submerged-arc filler metals is advantageously less than about 0.2% since greater amounts lead to inclusions of oxides in the weld deposits. However, at least about 0.1% is essential to provide adequate low temperature toughness to the deposits as well as assisting in the production of sound deposits. A particularly advantageous welding metal for use in submerged-arc welding processes contains less than about 0.05% carbon, about 0.2% silicon, about 3.5% nickel, about 1% manganese, about 0.3% molybdenum, about 0.15% aluminum, about 0.05% calcium (added to the melt), less than about 0.01% phosphorus, less than about 0.01% sulfur, the sum of any phosphorus and sulfur present being less than about 0.015% with the balance substantially iron.

As was mentioned hereinbefore, the welding material of the present invention can be used in coated electrode arc welding and in inert-gas arc welding, e.g., in an inert-gas tungsten-arc process or in a process wherein the metal itself is the electrode. In any case, the filler metal used in inert-gas metal-arc welding or as a core wire in coated electrode arc welding advantageously contains, by weight, about 3.25% to about 3.75% nickel, up to about 0.05% carbon, about 0.1% to about 0.2% silicon, about 0.8% to about 1.3% manganese, about 0.3% to about 0.7% aluminum, about 0.03% to about 0.07% calcium (added to the melt), less than about 0.01% phosphorus, less than about 0.01% sulfur, the sum of any phosphorus plus any sulfur present being less than about 0.015% with the balance essentially iron. These welding metals are characterized by having excellent forgeability and working characteristics and by being readily drawn into wire. In addition, in use, these welding metals produce sound welds having notch toughnesses of at least 15 foot-pounds at minus 150° F. The aluminum in the core wire of the coated electrode and in the filler wires for inert-gas welding is present in amounts from about 0.3% to about 0.7%. While 0.1% of aluminum is somewhat effective in eliminating weld cracking, at least 0.3% is more advantageously included when welds of the highest quality are desired. A particularly useful coated electrode core wire or an inert-gas filler wire is one containing, by weight, less than about 0.05% carbon, about 0.15% silicon, about 3.5% nickel, about 1% manganese, about 0.5% aluminum, about 0.05% calcium (added to the melt), less than about 0.01% phosphorus, less than about 0.01% sulfur, the sum of any phosphorus and any sulfur present being less than about 0.015% with the balance substantially iron.

The welding material of this invention when used as a coated electrode can include from about 20% to about 50% slag-forming and flux-forming ingredients by weight of the electrode, i.e., core wire and flux. Known metallurgically neutral flux compositions containing slag-forming and flux-forming ingredients may be used in combination with the welding material when it is used as a coated electrode. One such flux is set forth in Table I.

TABLE I

| Flux coating: | Range, percent by weight |
|---|---|
| Calcium carbonate | 30 to 70. |
| Cryolite | 30 to 70. |
| Bentonite | Up to 5. |

Other metallurgically neutral fluxes such as the titania types, the lime-fluorspar types, etc., may also be used as those skilled in the art will readily understand.

The ingredients used in making the flux are advantageously powdered ingredients. In general, the mixed ingredients usually have a particle size of between about 60 microns and about 300 microns.

A water-dispersible binder ordinarily is employed with the flux to provide a durable and hard coating on the core wire after drying and baking. The binder advantageously is of the silicate type as it produces a durable coating, i.e., a coating that is resistant to mechanical damage and that does not require a rebake prior to use. The silicate type binder may be an aqueous solution of sodium silicate and/or potassium silicate. Table II gives the amounts (in parts by weight of the dry flux) of ingredients which can be used for the binder. It is to be appreciated, however, as those skilled in the art will readily understand, that a silicate solution of a different specific gravity than shown herein also can be used.

TABLE II

| Ingredient | Range | Example |
|---|---|---|
| Sodium silicate solution (47° Baumé). | 10 to 20 | 15 |
| Water | As needed to provide extrudable consistency. | 2 |

The flux coating can be applied to the core wire in any suitable manner, e.g., by an extrusion process, and dried on the wire surface by suitable drying and/or baking. This results in a hard adherent coating of high mechanical strength relatively resistant to mechanical damage under normal handling conditions. A satisfactory drying or baking treatment of the flux and binder mixture comprises a normal continuous oven drying treatment followed by a baking treatment comprising gradually raising the temperature to about 600° F. and holding at that level for about two hours.

Examples of typical coated electrode dimensions (core diameter plus flux thicknesses) are given in Table III. All dimensions therein contained are in inches.

TABLE III

| Core diameter | Electrode diameter, range | Electrode diameter, example |
|---|---|---|
| 3/32 | 0.12 to 0.15 | 0.13 |
| 1/8 | 0.17 to 0.2 | 0.18 |
| 5/32 | 0.21 to 0.23 | 0.22 |
| 3/16 | 0.25 to 0.27 | 0.26 |

However, it is permissible, as will be apparent to those skilled in the art, to vary considerably the core diameter-flux thickness relationships from those given in the preceding table. The flux coating usually constitutes from about 25% to about 35% by weight of the electrode, including the slag-forming and flux-forming ingredients.

The compositions of the deposits and/or overlays, of course, will vary depending upon the exact composition of welding material employed and the composition of the base metal being welded. However, all-weld-metal deposits using the welding material of this invention will have compositions in the ranges shown in Table IV (in percent by weight).

TABLE IV

| Element: | Range, percent |
|---|---|
| Nickel | 2.5 to 5. |
| Manganese | 0.2 to 1.5. |
| Aluminum | 0.01 to 0.5. |
| Molybdenum | Up to 0.5. |
| Silicon | Up to 0.5. |
| Carbon | Up to 0.07. |
| Calcium | Up to 0.01. |
| Phosphorus | Less than 0.02. |
| Sulfur | Less than 0.02. |
| Phosphorus+sulfur | Less than 0.025. |
| Iron | Balance. |

For the purpose of giving those skilled in the art a better understanding of the invention and a better appreciation of the advantages of the invention, the following illustrative examples are hereinafter set forth:

Example I

A coated electrode was prepared by extruding a suitable low-hydrogen lime-cryolite type flux coating containing about 50% calcium carbonate, about 47% cryolite and about 3% bentonite on a 5/32" diameter core wire. The core wire contained, by weight, about 0.05% carbon, about 0.15% silicon, about 3.5% nickel, about 1% manganese, about 0.5% aluminum, about 0.05% calcium, less than about 0.01% phosphorus, less than about 0.01% sulfur with the balance essentially iron. The electrode was given a normal baking treatment at 600° F. for about two hours to dry the extruded coating. This electrode was then used to make a butt weld between two plates of 3½% nickel steel as described hereinafter.

The nickel steel plates conformed to ASTM Specification A–203, Grade E, and were of commercial origin. The chemical analysis of the plate indicated that it contained 0.12% carbon, 0.24% silicon, 0.54% manganese, 3.3% nickel, 0.013% phosphorus, 0.026% sulfur and balance essentially iron. The dimensions of each of the plates were ½" thick, 6" wide and 12" long. The joint was of the single V-groove type having an 80° angle between the members. A 1/16" lip was provided along the bevelled 12" edge of each plate. The two pieces of plate were spaced 1/16" apart over a grooved copper backing strap set into a 2" thick steel welding table and held in that position during welding by six heavy-duty C-clamps, three on each side.

The weld was made manually in the flat position using standard technique, without preheat. A maximum interpass temperature of 300° F. was maintained throughout, i.e., the temperature of the deposited metal was below about 300° F. before the next pass was started. When the joint was completed, the clamps were loosened and the weldment turned over with the penetration side facing upward. The root penetration was then ground smooth and all visual unfused areas below the plate surface ground out and a single sealing weld pass deposited along the root side.

The completed weld was then sawed into twelve ½" wide transverse slices. The sectioned surfaces were polished using a 200 grit rubber-bonded abrasive wheel, etched with mixed acids, and the weld areas visually examined for defects using a magnification of 15 diameters. No cracks, porosity, inclusions or defects of any kind were observed in any of the 12 slices. Six of the 12 slices were then given a stress-relieving heat treatment consisting of exposure to a temperature of 1150° F. for one hour and air-cooled. The other six slices were left in the as-welded condition.

Charpy keyhole and V-notch impact specimens of standard design were then machined from the 12 slices. The keyhole and V-notch specimens were machined in the center of the weld nugget with the axis of the notch running perpendicular to the axis of the weld and in the direction of the plate thickness. These were then impact-tested at minus 150° F. The results of the impact tests are shown in Table V along with the results of tests performed on specimens from a duplicate weld made using a commercial coated electrode of the ASTM/AWS E8016–C2 type of the same diameter as the coated electrode of this invention. Welds 1 and 2 were deposited with an electrode of this invention. Welds 3 and 4 were deposited with the prior art electrode.

TABLE V

| Weld No. | Impact specimen type | Impact in foot-pounds at minus 150° F. | | | |
|---|---|---|---|---|---|
| | | As-welded | | Stress-relieved | |
| | | Average [1] | Range | Average [1] | Range |
| 1 | V-notch | 27 | 24 to 30 | 52 | 46 to 57. |
| 2 | Keyhole | 25 | 18 to 29 | 39 | 39.[2] |
| 3 | V-notch | 15.2 | 14 to 16.5 | 18.3 | 18 to 18.5. |
| 4 | Keyhole | 9 | 8 to 11 | 12.6 | 9 to 17.5. |

[1] Average of three tests.
[2] All three values were the same.

It is apparent from the data in Table V that the weld deposits made using the electrodes within the contemplation of the present invention had much higher impact values than the weld deposits made using prior art electrodes in both the as-welded condition and the stress-relieved condition.

Example II

A butt joint was prepared by machining a U-groove along one 12" edge of each of two ¾" thick x 6" wide x 12" long plates conforming to ASTM Specification A–203, Grade E, of commercial origin. The plate contained, by weight, about 0.1% carbon, about 0.2% silicon, about 0.4% manganese, about 3.4% nickel, about 0.015% phosphorus, about 0.02% sulfur and the balance essentially iron.

The U-groove joint design provided a ¼" thick lip at the bottom of the joint, a ¼" root radius, a 30° angle between the members, and a 3/32" root spacing. The root pass was first deposited on the back side of the joint and ground smooth to permit contact with the surface of the welding platen during the subsequent welding from the top side. With the root pass in place and its reinforcement ground flush with the plate surface, the joint was turned over and positioned on a 6" thick steel platen with the U-groove facing upward. The joint was then bolted to the platen using six heavy U-strap clamps and hardened 1" diameter steel bolts, three on each side of the joint.

The joint was welded by the submerged-arc process under automatic control using a 1/8" diameter filler wire, in coil form, containing, by weight, less than about 0.05% carbon, about 0.2% silicon, about 3.5% nickel, about 1% manganese, about 0.3% molybdenum, about 0.19% aluminum, about 0.05% calcium (added to the melt), less than 0.01% each of sulfur and phosphorus with the balance essentially iron. The flux was a standard, fused, neutral, siliceous, submerged-arc flux of commercial production which is commonly used for welding steels (designated herein as Flux A). The weld was completed in fourteen passes. No preheat or postheat was used and the interpass temperature was held to less than 300° F. throughout.

After welding, the joint was sawed into ½" wide transverse slices and evaluated as the coated electrode weld described previously in Example I. No cracks, porosity, inclusions or defects of any kind were observed in any of the twelve slices examined. Half of these slices were then stress-relieved as before and both as-welded and stress-relieved sections were machined into Charpy V-notch impact test specimens as described earlier for the coated electrode weld of Example I. The specimens were then impact tested at minus 150° F.

Several other butt welds identical in every respect to the first were prepared, evaluated and machined into all-weld-metal tensile test specimens, 3/8" wide side-bend test specimens, and Charpy V-notch impact specimens. The impact specimens were tested over a range of temperatures from room temperature to minus 150° F. The tensile specimens and side-bend specimens were tested at room temperature.

The results of the impact tests are tabulated in Table VI.

TABLE VI

| Test temperature, ° F. | Impact, foot-pounds | | | |
|---|---|---|---|---|
| | As-welded | | Stress-relieved | |
| | Individual | Average | Individual | Average |
| 74 | 28, 27 | 27.5 | 31, 34 | 32.5 |
| 32 | 24, 25 | 24.5 | 30, 33 | 31.5 |
| Minus 100 | 17, 20, 16 | 17.7 | 23, 20, 22 | 21.7 |
| Minus 150 | 15, 15, 15 | 15 | 16, 19, 19 | 18 |

The composition of the weld metal of these welds was determined from shaper chips removed from the undiluted center portions of the weld deposit and it contained, by weight, about 3.5% nickel, about 1% manganese, about 0.28% molybdenum, about 0.017% aluminum, about 0.035% carbon, about 0.44% silicon, about 0.006% phosphorus, about 0.005% sulfur with the balance essentially iron. From Table VI, it is to be noted that all of the welds had impact strengths of 15 foot-pounds or higher even at minus 150° F. in the as-welded condition.

To determine the response of the welding wire described hereinbefore when used in conjunction with other standard commercial submerged-arc fluxes, three other sets of butt welds in 3/4" plate were also prepared. All welds were made using the same welding conditions and procedure described hereinbefore. The only difference among the sets of welds was the flux used. A flux used for one set of welds is designated as Flux B and was of the agglomerated or bonded type. The all-weld-metal deposits produced using Flux B contained, by weight, about 3.4% nickel, about 1% manganese, about 0.25% molybdenum, about 0.018% aluminum, about 0.04% carbon, about 0.3% silicon, about 0.006% phosphorus, about 0.01% sulfur with the balance essentially iron. Another, Flux C, was a fused flux similar to Flux A but one which was developed relatively recently specifically for welding of high strength steels. The composition of the all-weld-metal deposits produced using Flux C was about 3.5% nickel, about 0.9% manganese, about 0.27% molybdenum, about 0.017% aluminum, about 0.04% carbon, about 0.35% silicon, about 0.002% phosphorus, about 0.004% sulfur with the balance essentially iron. The other, Flux D, also a fused type of low silicon content, was developed within the last year or so for welding high yield strength ship hull plates. The all-weld-metal deposits produced using Flux D contained, by weight, about 3.5% nickel, about 0.04% manganese, about 0.27% molybdenum, about 0.028% aluminum, about 0.04% carbon, about 0.2% silicon, about 0.006% phosphorus, about 0.002% sulfur with the balance essentially iron. The results of the impact tests run on these additional welds with Fluxes B through D are shown in Table VII.

TABLE VII

| Flux designation | Test temperature, ° F. | Impact, foot-pounds | | | |
|---|---|---|---|---|---|
| | | As-welded | | Stress-relieved | |
| | | Individual | Average | Individual | Average |
| B | 74 | 41, 42, 43, 51 | 44.3 | 57, 59, 54, 62, 51, 62 | 57.5 |
| | 32 | 38, 46, 41, 43, 43, 47 | 43 | 50, 52, 50, 53, 56, 58 | 53.2 |
| | −100 | 22, 25, 24, 27, 21, 22 | 23.5 | 33, 36, 30, 33, 34, 29 | 32 |
| | −150 | 17, 19, 19, 23, 21, 22 | 20.2 | 21, 27, 24, 21, 30 | 24.6 |
| C | 74 | 43, 48 | 45.5 | 57, 66 | 61.5 |
| | 32 | 46, 45 | 45.5 | 57, 50 | 53.5 |
| | −100 | 24, 22, 18 | 21.3 | 24, 23 | 23.5 |
| | −150 | 19, 20, 18 | 19 | 20, 22 | 21 |
| D | 74 | 57, 76 | 66.5 | 67, 67 | 67 |
| | 32 | 60, 71 | 65.5 | 57, 64 | 60.5 |
| | −100 | 29, 40, 53 | 40.7 | 28, 37, 27 | 30.7 |
| | −150 | 20, 32, 41 | 31 | 29, 24, 21 | 24.7 |

From Table VII, it is clear that all of the filler metals of this invention produced weld deposits which exhibited excellent impact values at minus 150° F. even in the as-welded condition.

Side-bend tests were conducted on 3/8" wide transverse slices from the welds made using Fluxes A and B, to provide data for welds made using fluxes of both fused and agglomerated types. Two specimens in each of two conditions, as-welded and stress-relieved, were subjected to test. The bend tests were conducted by bending the polished and etched weld slices over a 1½" diameter steel bar until the "legs" of the U were parallel. At that point, the test was stopped and the specimens removed from the bend test jig and visually examined at a magnification of 15 diameters for defects. No defects of any kind were observed in any of the side-bend specimens.

0.357" diameter tensile test specimens were then machined from the weld metal obtained from each of the afore-described submerged-arc welds. The results of these all-weld-metal tensile tests are listed in Table VIII. Identical specimens were tested in the as-welded condition (1) and in the stress-relieved condition (2). The stress-relieved specimens were subjected to a heat treatment comprising holding the specimens at 1150° F. for one hour and then air-cooling.

TABLE VIII

| Flux designation | Weld condition | 0.2% yield strength (p.s.i.) | Ultimate tensile strength (p.s.i.) | Elongation in 1", percent | Reduction in area, percent |
|---|---|---|---|---|---|
| A | (1) | 99,300 | 107,700 | 18 | 53 |
| A | (2) | 98,200 | 108,100 | 20 | 54 |
| B | (1) | 87,500 | 97,800 | 23 | 55 |
| B | (2) | 91,500 | 101,000 | 21 | 53 |
| C | (1) | 103,600 | 107,700 | 23 | 70 |
| C | (2) | | | | |
| D | (1) | 90,000 | 99,300 | 21 | 59 |
| D | (2) | 82,000 | 93,600 | 28 | 65 |

A nickel steel plate having a composition as heretofore set forth was similarly tensile tested. The plate had a 0.2% offset yield strength of 55,900 p.s.i., an ultimate tensile strength of 75,500 p.s.i., an elongation in 1" of 26% and a reduction in area of 55%. Thus, the all-weld-metal specimens produced using the submerged-arc filler metals of this invention exhibited greater yield strengths and ultimate tensile strengths than did the nickel steel plate material while maintaining comparable ductility properties or characteristics.

*Example III*

A butt weld, similar to that described in Example I, was prepared between two A-203 plates (composition shown in Example I), ½" x 3" x 6", with the weld running in the 6" direction. A 5/32" diameter filler rod containing, by weight, less than 0.05% carbon, about 0.15% silicon, about 3.5% nickel, about 1% manganese, about 0.5% aluminum, about 0.05% calcium (added to the melt), less than 0.01% sulfur, less than 0.1% phosphorus with the balance essentially iron was used in the gas tungsten-arc process, manually controlled, to produce the weld. The joint consisted of a total of eleven passes. A backing shield of inert-gas was provided during welding the root pass to aid penetration flow and to prevent oxide inclusions. The inert-gas used was argon of a commercial purity.

After welding, the joint was sectioned in to six ½" wide transverse slices which were then polished, etched and visually examined for defects. No cracks, porosity, inclusions or defects of any kind were observed in any of the slices. Half of the slices were stress-relieved by holding at 1150° F. for one hour and then air-cooling while the other half were left in the as-welded condition. The slices were then machined into standard Charpy V-notch impact specimens as described previously, and tested at minus 150° F. In the as-welded condition, the all-weld-metal had an average impact value of 27.8 foot-pounds. In the stress-relieved state, the specimens had an average impact value of 27.5 foot-pounds.

*Example IV*

A butt joint was made between two pieces of nickel steel plate in a manner as described in Example III, using a welding wire having the same composition as used in making the weld of Example III. However, the diameter of the wire was 0.062" and the gas metal-arc process, automatically controlled, was employed in producing the weld joint. The weld joint design and backing shield were the same as used for the weld described in Example III. The joint was completed in nine passes. No defects were observed in visual examination at 15 diameters in any of the six all-weld-metal transverse slices, which were cut from the joint, after polishing and etching. Half of the slices were stress-relieved by holding at 1150° F. for one hour and then air-cooling. The other three were left in the as-welded condition. The six slices were then machined into standard Charpy V-notch impact specimens and tested at minus 150° F. In the as-welded condition, the three specimens had an average impact value of 29.8 foot-pounds. In the stress-relieved condition, the three specimens had an average impact value of 32.5 foot-pounds.

A second inert-gas metal-arc weld identical in all respects to the first, except that the weld was 12" in length, was prepared and two series of all-weld-metal 0.357" diameter tensile test specimens were machined therefrom. One series was in the as-welded condition, while the other series was in the stress-relieved condition described hereinbefore. The tensile specimens were tested at room temperature with the results set forth in Table IX.

TABLE IX

| Condition | 0.2% yield strength (p.s.i.) | Ultimate tensile strength (p.s.i.) | Elongation in 1", percent | Reduction in area, percent |
| --- | --- | --- | --- | --- |
| As-welded | 86,000 | 98,500 | 24 | 58 |
| Stress-relieved | 78,400 | 90,700 | 28 | 73 |

These values for ultimate tensile strength and 0.2% offset yield strength exceed the strengths obtained for the plate material as shown in Example III. In addition, the ductility of the all-weld-specimens are comparable to the ductility of the plate material which demonstrates the feasibility of employing the filler metals of this invention for inert-gas welding.

The present invention is particularly advantageously employed in the fabrication, reconstruction and/or repair of nickel steel vessels, other structures, parts, components, etc., used for cryogenic purposes, i.e., at temperatures as low as minus 150° F. Thus, the welding metals of the present invention are especially useful in welding of cryogenic nickel steels containing, by weight, about 2.25% to about 5% nickel, up to about 1.5% manganese, up to about 0.15% carbon, up to about 0.5% silicon, with the balance iron. In addition, the welding materials of this invention can be used for the welding of mild steel and alloy steels containing, by weight, up to about 12% nickel, up to about 1.5% manganese, up to about 0.15% carbon and up to about 0.5% silicon. Another feature of this invention is that the welding metals are usable in any of the commonly used arc-welding processes. In particular, the inert-gas filler wires of the invention are unique in that they may be used in the gas metal-arc and gas tungsten-arc welding processes when it is undesirable to employ a flux such as in depositing a root pass in a pipe or vessel where accessibility limitations prevent the removal of slag. In these situations, the wire has proven to be an ideal material for the purpose when formed into backing rings or consumable insert rings and used with the gas tungsten-arc process.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A submerged-arc filler wire for producing welds having impact values of at least about 15 foot-pounds at temperatures as low as about minus 150° F. which filler wire contains, by weight, about 3.5% nickel, about 1% manganese, about 0.3% molybdenum, about 0.15% aluminum, less than about 0.05% carbon, about 0.2% silicon, about 0.05% calcium added, less than about 0.01% phosphorus, less than about 0.01% sulfur, the sum of any phosphorus and any sulfur present being less than about 0.015% with the balance essentially iron.

2. A submerged-arc filler wire for producing welds having impact values of at least about 15 foot-pounds at temperatures as low as about minus 150° F. which filler wire contains, by weight, about 3.25% to about 3.75% nickel, about 0.8% to about 1.3% manganese, about 0.25% to about 0.35% molybdenum, about 0.1% to about 0.2% aluminum, less than about 0.05% carbon, about 0.1% to about 0.2% silicon, about 0.03% to about 0.07% calcium added, less than about 0.01% phosphorus, less than about 0.01% sulfur, the sum of any phosphorus and any sulfur present being less than about 0.015% with the balance essentially iron.

3. A welding metal for producing improved cryogenic weld deposits which welding metal contains, by weight, about 3% to about 4% nickel, about 0.1% to about 0.7% aluminum, about 0.8% to about 1.3% manganese, up to about 0.5% molybdenum, less than about 0.07% carbon, up to about 0.7% silicon, up to about 0.1% calcium added, less than about 0.01% phosphorus, less than about 0.01% sulfur, the sum of any phosphorus and any sulfur present being less than about 0.015% with the balance essentially iron.

4. A welding metal for producing improved cryogenic weld deposits which welding metal contains, by weight, about 2.5% to about 5% nickel, about 0.1% to about 0.7% aluminum, about 0.4% to about 1.5% manganese, up to about 0.5% molybdenum, less than about 0.07% carbon, up to about 0.7% silicon, up to about 0.1% calcium added, less than about 0.02% phosphorus, less than about 0.02% sulfur, the sum of any phosphorus and any sulfur present being less than about 0.025% with the balance essentially iron.

5. A nickel steel welding metal for producing improved cryogenic weld deposits which steel welding metal consists essentially of, by weight, about 2.5% to about 5% nickel, about 0.1% to about 0.7% aluminum, up to about 0.5% molybdenum, less than about 0.07% carbon, up to about 0.7% silicon, less than about 0.02% phosphorus, less than about 0.02% sulfur, the sum of any phosphorus and any sulfur present being less than about 0.025% and about 0.4% to about 1.5% manganese with the balance essentially iron.

6. A process for producing welds having impact values of at least about 15 foot-pounds at temperatures as low as about minus 150° F. between two nickel steel members which contain, by weight, about 2.5% to 5% nickel, up to about 1.5% manganese, up to about 0.15% carbon, up to about 0.5% silicon, with the balance iron which process comprises melting by arc-welding a welding alloy containing, by weight, about 3% to about 4% nickel, about 0.8% to about 1.3% manganese, about 0.1% to about 0.7% aluminum, up to about 0.5% molybdenum, less than about 0.07% carbon, up to about 0.7% silicon, up to about 0.1% calcium, less than about 0.01% phosphorus, less than about 0.01% sulfur, the sum of any phosphorus and any sulfur present being less than about 0.015% with the balance essentially iron and depositing said melted welding alloy between the nickel steel members.

7. A process for producing sound, cryogenic iron-nickel weld deposits on a ferrous member which comprises providing a coated welding electrode having a core wire containing, by weight, about 3.25% to about 3.75% nickel, about 0.1% to about 0.2% silicon, about 0.8% to about 1.3% manganese, about 0.3% to about 0.7% aluminum, up to about 0.05% carbon, about 0.03% to about 0.07% calcium added, less than about 0.01% phosphorus, less than about 0.01% sulfur, the sum of any phosphorus and any sulfur present being less than about 0.015% with the balance essentially iron and having a flux containing, by weight, about 30% to about 70% calcium carbonate, about 30% to about 70% cryolite and up to about 5% bentonite, melting said coated electrode and depositing by arc-welding on said ferrous member a metal weld deposit containing, by weight, about 2.5% to about 5% nickel, about 0.2% to about 1.5% manganese, about 0.01% to about 0.5% aluminum, up to about 0.5% molybdenum, up to about 0.5% silicon, up to about 0.07% carbon, up to about 0.01% calcium, less than about 0.02% phosphorus, less than about 0.02% sulfur, the sum of any phosphorus and any sulfur present being less than about 0.025% with the balance essentially iron.

8. A process for producing welds having impact values of at least about 15 foot-pounds at temperatures as low as about minus 150° F. on at least one ferrous member which comprises providing a submerged-arc filler metal containing, by weight, about 3.25% to about 3.75% nickel, about 0.8% to about 1.3% manganese, about 0.25% to about 0.35% molybdenum, about 0.1% to about 0.2% aluminum, less than about 0.05% carbon, about 0.1% to about 0.2% silicon, about 0.03% to about 0.07% calcium added, less than about 0.01% phosphorus, less than about .01% sulfur, the sum of any phosphorus and any sulfur present being less than about 0.015% with balance essentially iron and melting said filler metal by arc-welding and depositing the melted metal in the presence of a metallurgically neutral flux containing fluxing and slagging ingredients to produce a weld containing, by weight, about 2.5% to about 5% nickel, about 0.2% to about 1.5% manganese, about 0.01% to about 0.5% aluminum, up to about 0.5% molybdenum, up to about 0.5% silicon, up to about 0.07% carbon, up to about 0.01% calcium, less than about 0.02% phosphorus, less than about 0.02% sulfur, the sum of any phosphorus and any sulfur present being less than about 0.025% with the balance essentially iron.

9. A process for producing welds having impact values of at least about 15 foot-pounds at temperatures as low as about minus 150° F. on at least one ferrous member which comprises providing a filler metal containing, by weight, about 3.25% to about 3.75% nickel, up to about 0.05% carbon, about 0.1% to about 0.2% silicon, about 0.8% to about 1.3% manganese, about 0.3% to about 0.7% aluminum, about 0.03% to about 0.07% calcium added, less than about 0.01% phosphorus, less than about 0.01% sulfur, the sum of any phosphorus and any sulfur present being less than about 0.015% with the balance essentially iron and melting said filler wire and depositing the melted metal on said ferrous member in an inert atmosphere to produce a weld containing, by weight, about 2.5% to about 5% nickel, about 0.2% to about 1.5% manganese, about 0.01% to about 0.5% aluminum, up to about 0.5% molybdenum, up to about 0.5% silicon, up to about 0.07% carbon, up to about 0.01% calcium, less than about 0.02% phosphorus, less than about 0.02 sulfur, the sum of any phosphorus and any sulfur present being less than about 0.025% with the balance essentially iron.

10. A welding metal for use in coated electrode and inert-gas arc welding containing, by weight, about 3.5% nickel, about 1% manganese, about 0.5% aluminum, about 0.05% calcium added, less than about 0.05% carbon, about 0.15% silicon, less than about 0.01% phosphorus, less than about 0.01% sulfur, the sum of any phosphorus and any sulfur present being less than about 0.015% with the balance essentially iron.

11. A welding metal for use in coated electrode and inert-gas arc welding containing, by weight, about 3.25% to about 3.75% nickel, up to about 0.05% carbon, about 0.1% to about 0.2% silicon, about 0.8% to about 1.3% manganese, about 0.3% to about 0.7% aluminum, about 0.03% to about 0.07% calcium added, less than about 0.01% phosphorus, less than about 0.01% sulfur, the sum of any phosphorus and any sulfur present being less than about .0015% with the balance essentially iron.

References Cited by the Examiner

UNITED STATES PATENTS

| | | | |
|---|---|---|---|
| 2,140,237 | 12/38 | Leitner. | |
| 2,744,036 | 5/56 | Pease et al. | 117—206 |
| 3,097,294 | 7/63 | Kubli et al. | 75—124 |

JOHN F. CAMPBELL, *Primary Examiner.*

UNITED STATES PATENT OFFICE
CERTIFICATE OF CORRECTION

Patent No. 3,195,230                      July 20, 1965

James V. Peck et al.

It is hereby certified that error appears in the above numbered patent requiring correction and that the said Letters Patent should read as corrected below.

Column 2, lines 22 and 23, for "application" read -- applications --; column 11, line 4, for "0.1%" read -- 0.01% --; line 12, for "in to" read -- into --; line 51, for "tenside" read -- tensile --; same column 11, line 52, for "condtiion" read -- condition --; column 12, line 42, for "tha nabout" read -- than about --; column 14, line 1, for ".01%" read -- 0.01% -- line 3, before "balance" insert -- the --; line 33, for "0.02" read -- 0.02% --; same column 14, line 54, for ".0015%" read -- 0.015% --.

Signed and sealed this 12th day of April 1966.

(SEAL)
Attest:

ERNEST W. SWIDER
Attesting Officer

EDWARD J. BRENNER
Commissioner of Patents